United States Patent [19]

Saltzman

[11] 4,343,506
[45] Aug. 10, 1982

[54] LOW-DRAG GROUND VEHICLE PARTICULARLY SUITED FOR USE IN SAFELY TRANSPORTING LIVESTOCK

[75] Inventor: Edwin J. Saltzman, North Edwards, Calif.

[73] Assignee: The United States of America as represented by the Administrator of the National Aeronautics and Space Administration, Washington, D.C.

[21] Appl. No.: 175,453

[22] Filed: Aug. 5, 1980

[51] Int. Cl.³ .............................................. B62D 35/00
[52] U.S. Cl. .................................... 296/1 S; 105/2 R; 244/53 B; 296/24 C; 296/91
[58] Field of Search ........................ 296/1 S, 91, 24 C; 105/2 R, 2 A; 244/53 B

[56] References Cited

U.S. PATENT DOCUMENTS

| 2,612,027 | 9/1952 | McGan | 296/24 C |
| 4,092,044 | 5/1978 | Hoffman | 296/24 C |
| 4,142,755 | 3/1979 | Keedy | 296/1 S |
| 4,174,083 | 4/1977 | Mohn | 244/53 B |
| 4,199,185 | 4/1980 | Woolcock | 296/1 S |

Primary Examiner—Joseph F. Peters, Jr.
Assistant Examiner—John A. Carroll
Attorney, Agent, or Firm—Darrell G. Brekke; John R. Manning

[57] ABSTRACT

A low-drag truck consisting of a tractor-trailer rig (10) characterized by a rounded forebody and a protective fairing (16) for the gap conventionally found to exist between the tractor and the trailer, particularly suited for establishing an attached flow of ambient air along the surfaces thereof, and a forward facing, ram air inlet and duct (24 and 22) and a plurality of submerged inlets (18) and outflow ports (20) communicating with the trailer (14) for continuously flushing heated gasses from the trailer as the rig is propelled at highway speeds.

7 Claims, 6 Drawing Figures

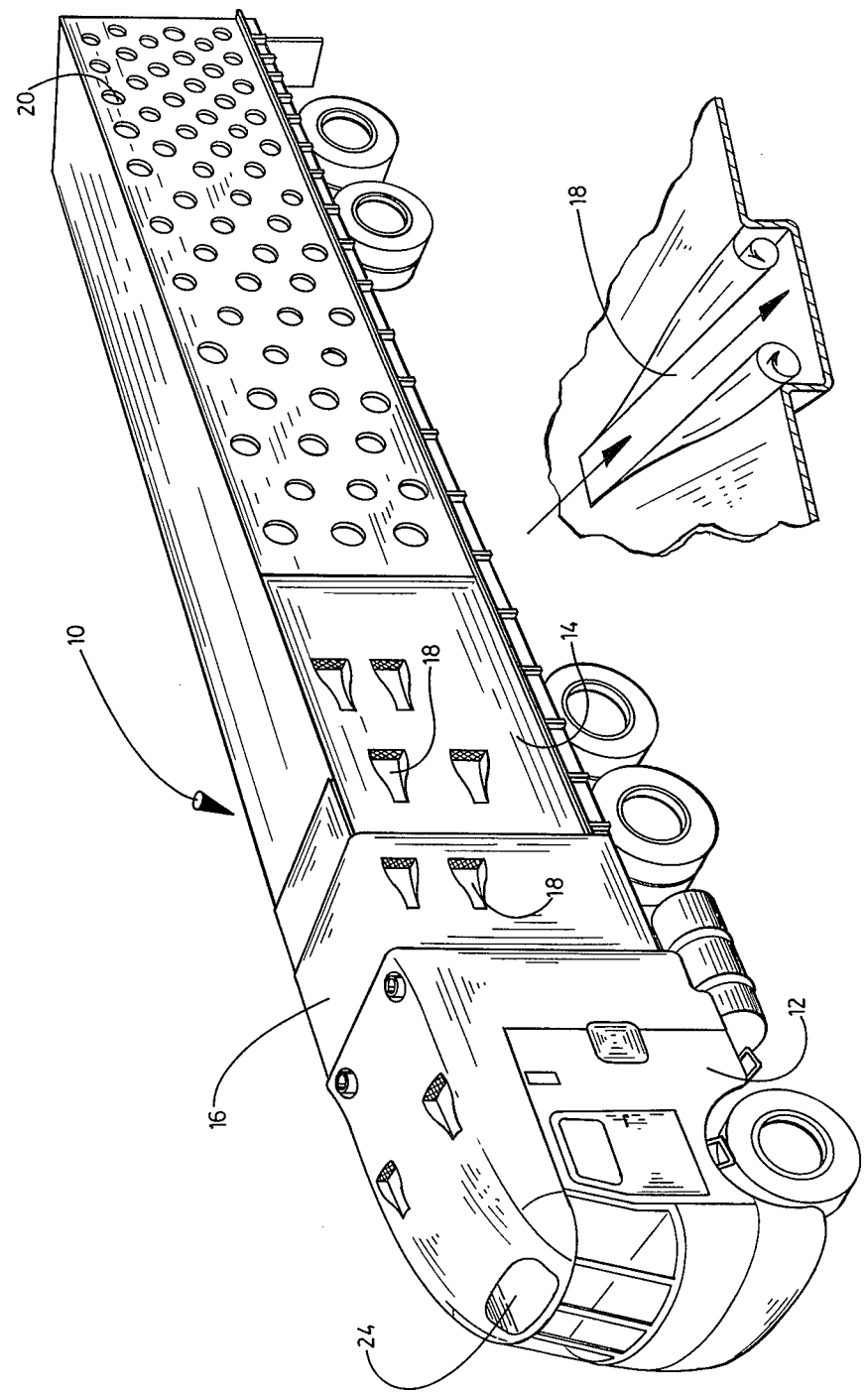

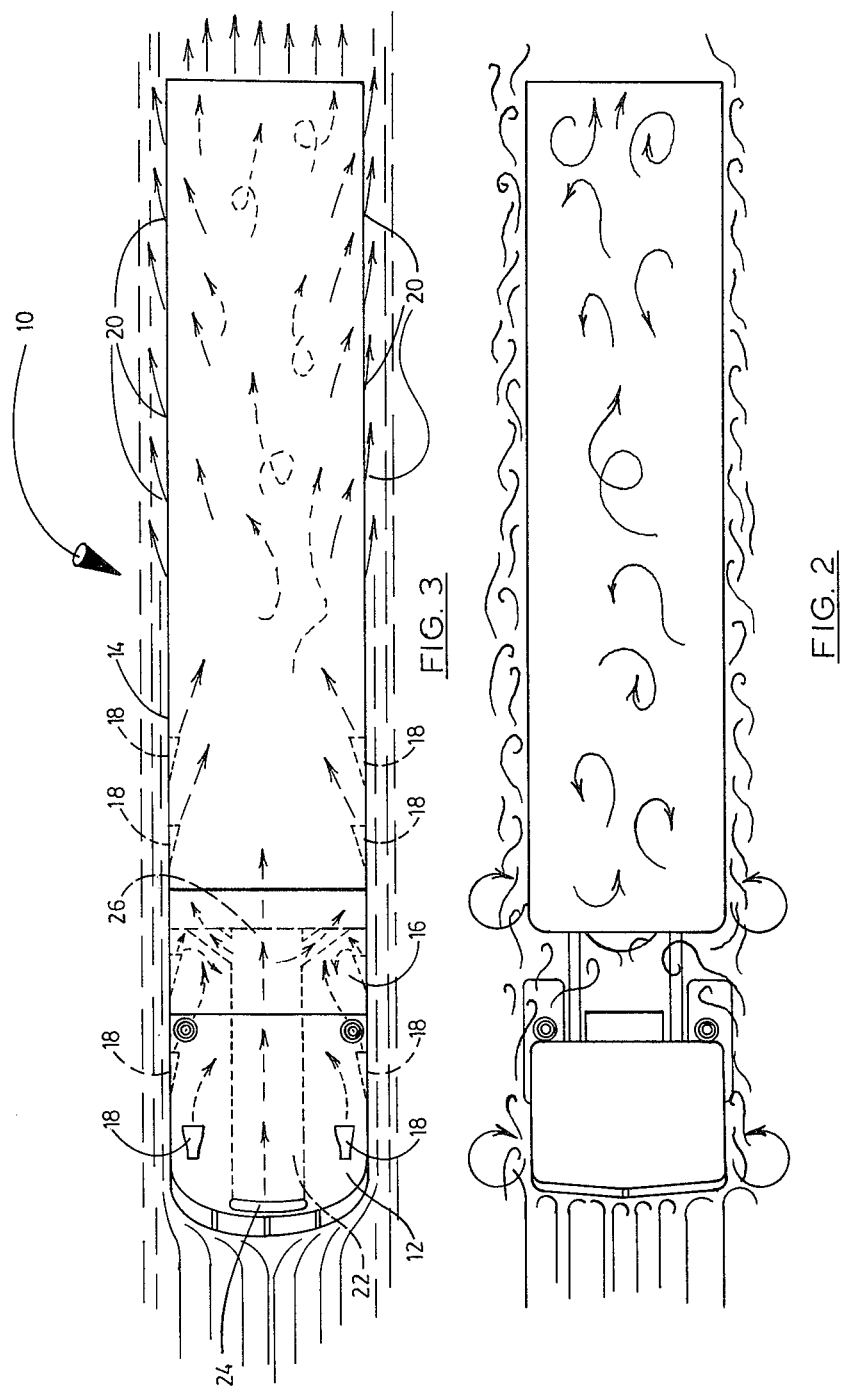

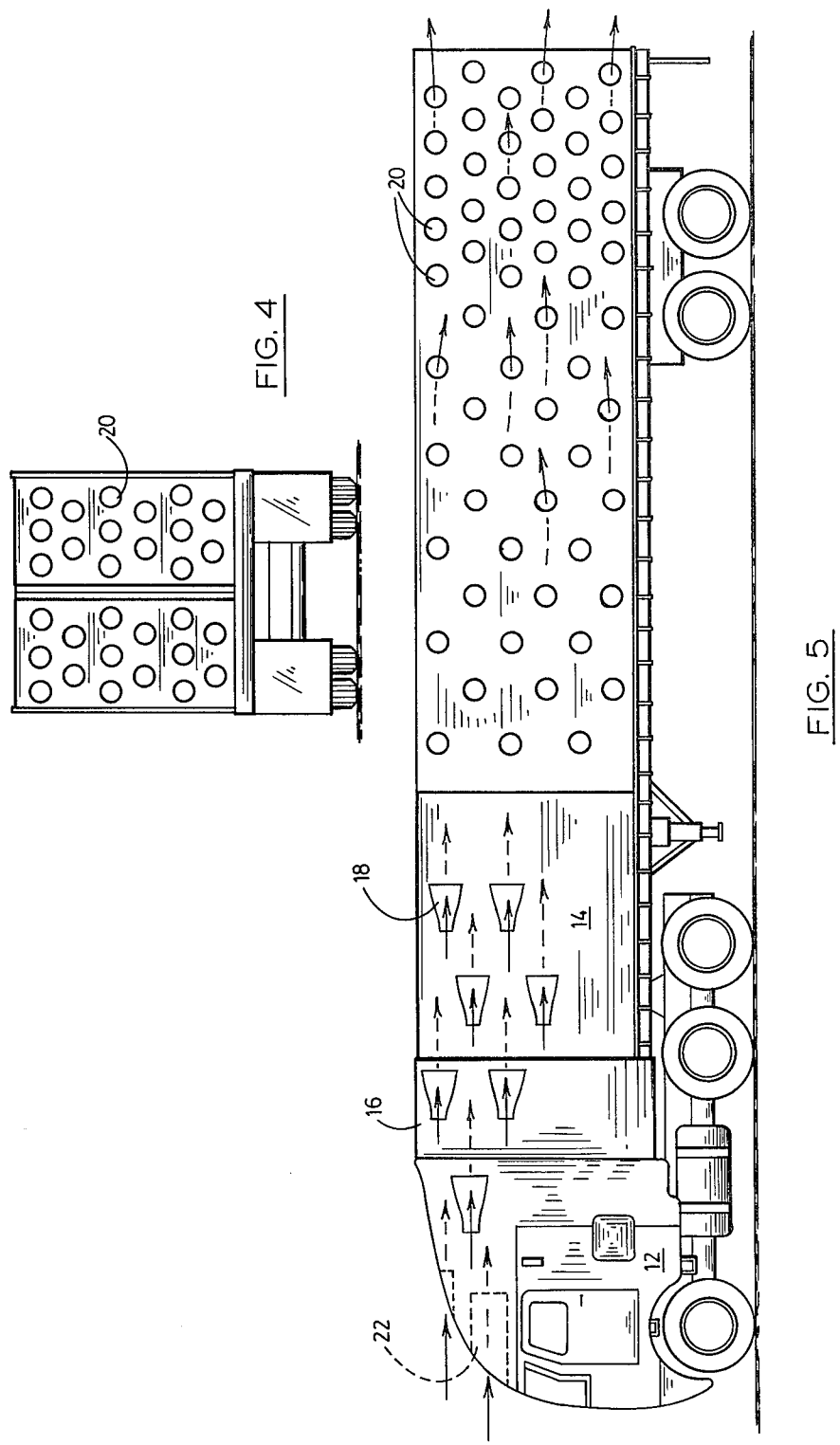

LOW-DRAG GROUND VEHICLE PARTICULARLY SUITED FOR USE IN SAFELY TRANSPORTING LIVESTOCK

ORIGIN OF THE INVENTION

The invention described herein was made in the performance of work by an employee of the United States Government and may be manufactured and used by or for the Government for Governmental purposes without the payment of any royalties thereon or therefor.

BACKGROUND OF THE INVENTION

1. Field of the Invention

The invention generally relates to the LDT (Low-Drag Truck) industry, and more particularly to an improved low-drag tractor-trailer rig or to a non-articulating straight truck characterized by a rounded forebody and a protective fairing for the gap between the tractor and the trailer, in the case of the former, for establishing an attached flow of ambient air extended along surfaces of the trailer and a forward facing ram air inlet and submerged inlets for continuously flushing heated gasses from the trailer as the rig is propelled at highway speeds.

2. Description of the Prior Art

The use of tractor-trailer rigs or combinations having rounded forebodies and fairings forming protective shields between the cabs and the trailers thereof in order to facilitate the attachment thereto of an air flow, for purposes of reducing aerodynamic drag, and consequently fuel consumption, generally is well known. For example, note the patent to Servais et al U.S. Pat. No. 4,036,519 which illustrates a tractor-trailer rig utilizing an LDT-type forebody.

Additionally, the use of vents for flushing the atmosphere of such trailers also is well known. For example, see the patent to Stone U.S. Pat. No. 4,018,480 which discloses a trailer having a plurality of ventilation openings formed through the wall panels near the lower ends thereof.

Notwithstanding the fact that the use of LDT vehicles generally is well known, unique problems arise, particularly in the livestock industry, when a use of such vehicles is contemplated. One of the problems of particular significance is that of the intense build-up of heat which can be expected within the enclosure or fairing provided for the gap between the cab and trailer. This build-up of heat tends to create a condition normally tragic for livestock riding near the front of the trailer.

Moreover, because of the nature of the cargo transported by livestock haulers, toxic fumes and gasses accumulate in stagnant pockets within the cargo box leading to discomfort and even physical damage to the cargo. Such a result is obtained even when employing typical livestock haulers having ventilation ports and the like defined in the walls of the cargo box.

It is perhaps appropriate to note the combination of over-heat, generation of toxic gasses within the cargo box, as well as the uneven ventilation involved, often results in consequences more drastic than simply the comfort of livestock, though the comfort factor is in itself important. During a year when livestock losses associated with shipping fever were tabulated, 1974, the total losses were on the order of $500 million dollars. Such losses are indeed important to both producers and consumers.

It is therefore the general purpose of the instant invention to provide an improved, LDT or low-drag ground vehicle, either of the non-articulating type or an articulating tractor-trailer rig, particularly suited for use in transporting livestock and other cargo requiring continuous temperature and atmosphere control.

OBJECTS AND SUMMARY OF THE INVENTION

It is an object of the instant invention to provide an improved, low-drag ground vehicle either of the nonarticulating type or the articulating type.

It is another object to provide in combination with an LDT means for continuously controlling temperature and flushing toxic atmosphere from the interior of the cargo box or trailer thereof.

It is another object to provide in combination with a low-drag tractor-trailer rig a forward facing ram air inlet and a plurality of submerged inlets particularly adapted for ingesting portions of an attached flow of air and introducing the ingested portions of the flow into the trailer for thereby continuously flushing the atmosphere therefrom without significantly enhancing vehicle drag.

These and other objects and advantages are achieved through the use of a forward facing, ram air inlet and a plurality of submerged inlets interconnected in combination with the fairing and trailer of a low-drag tractor-trailer combination or rig, whereby the trailer is continuously pressurized through an ingestion of portions of an attached flow of air established as the vehicle is propelled at highway speeds, as will become more readily apparent by reference to the following description and claims in light of the accompanying drawings.

DESCRIPTION OF THE DRAWINGS

FIG. 1 is a perspective view of an LDT (Low-Drag Truck) embodying the principles of the instant invention.

FIG. 2 is a top plan view of a conventional base line cab-over vehicle including arrows diagrammatically illustrating the aerodynamic turbulence associated with the exterior surfaces and the stagnation of atmosphere within the cargo box thereof.

FIG. 3 is a top plan view of an operating LDT including arrows diagrammatically illustrating an attached air flow established along the exterior surfaces and the flushing effects achieved employing the forward facing, ram air inlet and the several submerged inlets, in the manner consistent with the principles of the instant invention.

FIG. 4 is a rear elevational view of the LDT shown in FIG. 1.

FIG. 5 is a side-elevational view of the LDT shown in FIG. 3 diagrammatically depicting ingestion of portions of the attached air flow.

FIG. 6 is a fragmented, cross-sectional view of a submerged inlet comprising a so-called NACA submerged inlet depicting vortexes generated by sharp edges provided for enhancing the mass/flow ratio of air ingested by the duct.

DESCRIPTION OF THE PREFERRED EMBODIMENT

Referring now to the drawings, with more particularity, wherein like reference characters designate like or corresponding parts throughout the several views, there is shown in FIG. 1 a low-drag ground vehicle, generally designated 10, conforming in its configuration to that of a well known Low-Drag Truck, herein referred to simply as an LDT.

It is here observed that as illustrated in FIG. 2, where a rig, such as the conventional base-line, cab-over truck is propelled at highway speeds, excessive vortexing and turbulence occurs in the resultant air stream. The operation of such vehicles is, therefore, necessarily attended by excessive vehicle drag; an attachment of stagnant pools of "highway gasses", including toxic fumes; and generally poor vehicle ventilation.

As shown in FIGS. 1, 3 and 5, the vehicle 10 comprises an LDT including a tractor 12, a trailer 14, and an articulated fairing 16 projected rearwardly over the cab to the trailer, in protective relation with the resultant gap normally found to exist between the cab and the trailer. Since the purpose of and function of an LDT generally are well known, a detailed description of the vehicle 10 is deemed unnecessary to provide for a complete understanding of the invention. Therefore, it is believed sufficient to appreciate the fact that, as illustrated in FIG. 3, the vehicle 10 is provided with a rounded forebody which, in cooperation with the fairing 16, serves to establish an air stream about the exterior of the vehicle which comprises a flow aerodynamically attached to the surfaces of the vehicle, as the vehicle is propelled at highway speeds.

It is particularly important to note that the vehicle 10 includes a ram air inlet and a plurality of submerged inlets 18, the purpose of which is to ingest portions of the impinging and attached air flow and introduce the ingested portions of the air flow into the interior of the fore section of the trailer 14, while out-flow ports 20 are provided at the mid and rear sections of the trailer for accommodating a discharge of gasses from the trailer. Thus a continuous flushing of the atmosphere from the trailer is achieved in response to the vehicle 10 being operated at highway speeds.

It is believed important to note that the term "submerged inlets", as herein employed, refers to inlets which are of a design frequently referred to as NACA submerged inlets inasmuch as these inlets or ducts were developed by the National Advisory Committee for Aeronautics in order to achieve efficient ingestion of air from the surface of the fuselage of aircraft for delivery to engines, equipment, components, and the like.

Even though the details of ram air inlets and the submerged inlets 18 are well known and form no part of the claimed invention, it should be noted that a use of these inlets is deemed critical to a satisfactory operation of the invention as herein described. This results from the fact that these inlets comprise ducts which are so designed as to obtain optimum delivery of air with a minimal drag penalty being imposed. A NACA submerged inlet is, as illustrated in FIG. 6, provided with a ramp and a pair of curved, divergent walls, which intersect the surface to form sharp edges. The sharp edges defined by the walls and the surface produce vortexes which, in combination with the divergence thereof, re-energize and thin a boundary layer as it develops along the ramp, whereby the boundary layer is controlled and the efficiency of the inlet is enhanced. Therefore, it is particularly important to appreciate that the submerged inlets 18 have a unique capability of ingesting optimum quantities of air from an attached flow, all without impairing the characteristics of the flow as it passes over the exterior surfaces of the LDT or vehicle 10.

As further illustrated in FIG. 3, ingested portions of the air flow are introduced in the forward portions of the trailer 14 while the generally toxic atmosphere including gasses generated within the trailer are swept, by these portions of the flow, and are discharged from the trailer at the mid and rear portions thereof, with a resultant minimal attendant stagnation or pooling of the atmosphere within the trailer.

As a practical matter, while the number, shape and distribution of the out-flow ports 20 may be established empirically, and are varied in proportion to the mass flow rate of air to be ingested, the number and distribution of the inlets 18 and out-flow ports 20 are such as to assure a continuous pressurization of the trailer 14 as the vehicle 10 is operated at highway speeds.

As also shown in FIG. 3, submerged inlets 18 also are connected in communication with the space between the cab and trailer for flushing downwardly air and heat entrapped in this space. Thus the space is continuously cooled.

A ram air duct 22 will be provided for achieving a further introduction of the air flow to the trailer. The duct 22, as shown, includes an inlet orifice 24, FIG. 3, and a discharge orifice 26 communicating with the interior of the trailer 14, preferably through the leading end wall thereof. The ram air duct 22 is of a suitable design, the details of which form no part of the claimed invention, however, the duct 22 preferably is comprised of a flexible duct which accommodates articulation of the tractor-trailer rig. Additionally, the inlet orifice 24 is provided with smooth, nicely rounded edges, the radius of which preferably is on the order of six inches. Consequently, ram air is ingested via the orifice 24 with minimal attendant turbulence.

Finally, while not shown, it should be apparent that the ducts 18 and 22 are particularly suited for establishing temperature control, particularly in colder climates, for the trailer 14, since the ducts readily may be provided with selectively operable closure members for purposes of restricting the flow of air therethrough.

OPERATION

It is believed that in view of the foregoing description, the operation of the instant invention is readily understood, however, for the sake of assuring a complete understanding, the operation thereof is at this point briefly reviewed.

With the vehicle 10 assembled in the manner hereinbefore described, the vehicle 10 is prepared for operation, such as the hauling of livestock and the like. However, it is to be understood that the utility of the vehicle is not limited to the field of transporting livestock but may be employed in any field in which it is desired that an LDT be utilized for hauling cargo requiring improved ventilation and/or temperature control.

With reference to FIG. 3, it can be seen that as the vehicle 10 is driven at highway speeds there is established along the exterior surfaces thereof an attached air flow. The submerged inlets 18 serve to ingest portions of the attached air flow and introduce the portions into the interior of the trailer 14. Additionally, ram air is introduced into the trailer 14 via the orifice 24 and the duct 22. Of course, the space between the cab and trailer continuously is flushed as air moves from the submerged inlets 18 formed in the fairing 16 through the space to be discharged therebeneath. Thus an increased atmospheric pressure is established within the trailer 14 as well as the space between the cab and trailer.

Simultaneous with the establishment of increased pressures within the trailer 14, the outflow ports 20 accommodate a discharge of gasses from the trailer to the region behing the vehicle and to the air stream flowing along the sides of the trailer, all without significantly enhancing turbulence, for thus disrupting the attached air-flow, and inducing drag. It should be recognized that the portion of air flowing out of ports at the base, or rear surface, of the cargo box will reduce the drag of the vehicle. This flushing or discharge of gasses is, in operation, continuous for thus continuously renewing the air and controlling the temperature within the trailer.

In view of the foregoing, it is believed to be readily apparent that through the use of a so-called LDT design for livestock haulers, fuel economy is realized, and moreover, through the use of ram air and submerged inlets, the life supporting environment within the trailer 14 is greatly enhanced. Thus there has been provided a practical solution to many of the problems heretofore plaguing designers of livestock haulers and the like.

What is claimed is:

1. In combination with a low-drag ground vehicle including a streamlined forebody and an elongated, substantially closed cargo box, said forebody being suitably shaped for establishing an attached flow of ambient air along the surface of the upper and side walls of the box as the vehicle is propelled at highway speeds, the improvement comprising:

means for continuously flushing gases from the box as the vehicle is propelled at highway speeds including a ram air inlet system with an intake flushly disposed on said forebody and a plurality of submerged inlets defined in the walls of the box for ingesting portions of the attached flow and delivering the ingested portions of the flow to the interior of the box, and a plurality of flow discharge ports defined in the walls of the box aft of the plurality of submerged inlets for discharging gases from the interior of the box to the attached flow.

2. An improvement as defined in claim 1 wherein the pressure within the interior of said box is continuously maintained at a value greater than one atmosphere as the vehicle is propelled at highway speeds.

3. An improvement as defined in claim 1 or 2 wherein said ground vehicle comprises a tractor and a trailer having a gap defined therebetween, and an articulated air shield projected rearwardly over the tractor enclosing said gap, said inlets are defined both in said shield and in the fore section of the trailer, and said flow discharge ports are defined in the mid and aft sections of said box.

4. An improvement as defined in claim 3 wherein said ram air inlet system has an intake opening disposed above said tractor and a duct with discharge opening communicating with the forward face of said box.

5. In combination with a low-drag ground vehicle characterized by a trailer including a closed, elongated flat-sided cargo box, a tractor with rounded side forebody edges connected to said trailer in spaced relation therewith, and an articulated fairing forming a rounded air shield projected rearwardly over the tractor protectively enclosing the space defined between the tractor and the trailer, said air shield and said forebody edges being of a streamlined configuration for establishing an attached flow of ambient air along the surfaces of the box as the vehicle is caused to progress at highway speeds, means for continuously flushing the atmosphere from the interior of said cargo box comprising:

a ram-air duct communicating with the forward face of the box and having an intake opening flushly disposed in said fairing above the tractor, a plurality of mutually spaced submerged inlets defined in the forebody of the box in communicating relation with the interior thereof for ingesting portions of an attached flow and delivering said portions of the flow to the interior of the box as the vehicle is operated at highway speeds, whereby an increased pressure condition is established within the box, and a plurality of out-flow ports for discharging gases from the interior of said box to the attached flow of ambient air at a rate sufficient to maintain the increased pressure condition established within the box.

6. A combination as defined in claim 5 further comprising submerged inlets defined in the fairing and connected in communicating relation with the space defined in the tractor and trailer for continuously circulating ingested portions as they flow through the space.

7. A combination as defined in claim 5 wherein each of said submerged inlets comprises a NACA submerged inlet characterized by divergent ramp walls and sharp edges.

* * * * *